United States Patent
Kaplan et al.

(10) Patent No.: US 7,349,710 B2
(45) Date of Patent: Mar. 25, 2008

(54) SYSTEM AND METHOD FOR WIRELESS DEVICE CONFIGURATION

(75) Inventors: Diego Kaplan, San Diego, CA (US); Bilhan Kirbas, La Jolla, CA (US)

(73) Assignee: Kyocera Wireless Corp., San Diego, CA (US)

( * ) Notice: Subject to any disclaimer, the term of this patent is extended or adjusted under 35 U.S.C. 154(b) by 163 days.

(21) Appl. No.: 11/382,122

(22) Filed: May 8, 2006

(65) Prior Publication Data

US 2006/0195517 A1    Aug. 31, 2006

Related U.S. Application Data

(63) Continuation of application No. 10/120,956, filed on Apr. 11, 2002, now Pat. No. 7,043,263.

(51) Int. Cl.
*H04Q 7/20*    (2006.01)
(52) U.S. Cl. ...................... 455/466; 455/418; 455/419; 455/420; 455/517
(58) Field of Classification Search ................ 455/418, 455/419, 420, 466, 517
See application file for complete search history.

(56) References Cited

U.S. PATENT DOCUMENTS

| 6,029,065 | A | 2/2000 | Shah |
| 6,223,028 | B1 | 4/2001 | Chang et al. |
| 6,275,693 | B1 | 8/2001 | Lin et al. |
| 6,292,833 | B1 | 9/2001 | Liao et al. |
| 2002/0144151 | A1* | 10/2002 | Shell et al. ................ 713/201 |
| 2003/0186721 | A1 | 10/2003 | Kanazawa et al. |

* cited by examiner

*Primary Examiner*—Joseph Feild
*Assistant Examiner*—S. Smith

(57) ABSTRACT

A system and method for configuring, or provisioning, mobile communication devices 10 by an administrator 12. Administrator 12 comprises a computer, or second mobile device 18. Feature codes for configuring a device 10 are encrypted into a Short Message System (SMS) message or an Internet protocol-based Over-the-Air (IOTA) protocol message and transmitted to mobile device 10. The message further contains a mobile identifier and a set/reset bit to indicate whether the features are to be set or reset. The encrypted message is communicated to mobile device 10 over communications channel 14 of a mobile communication network.

10 Claims, 2 Drawing Sheets

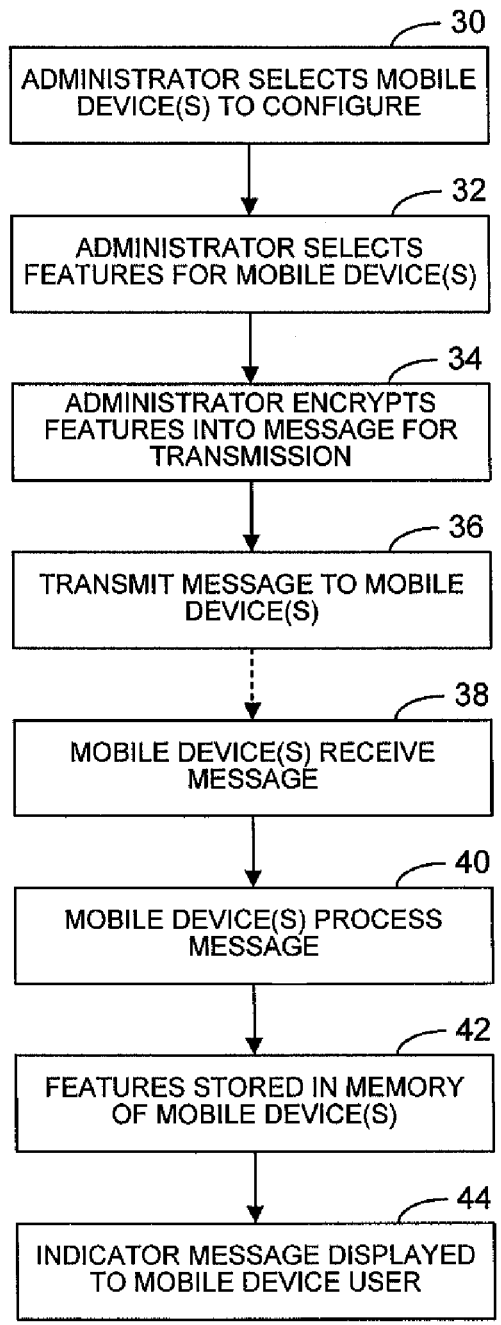
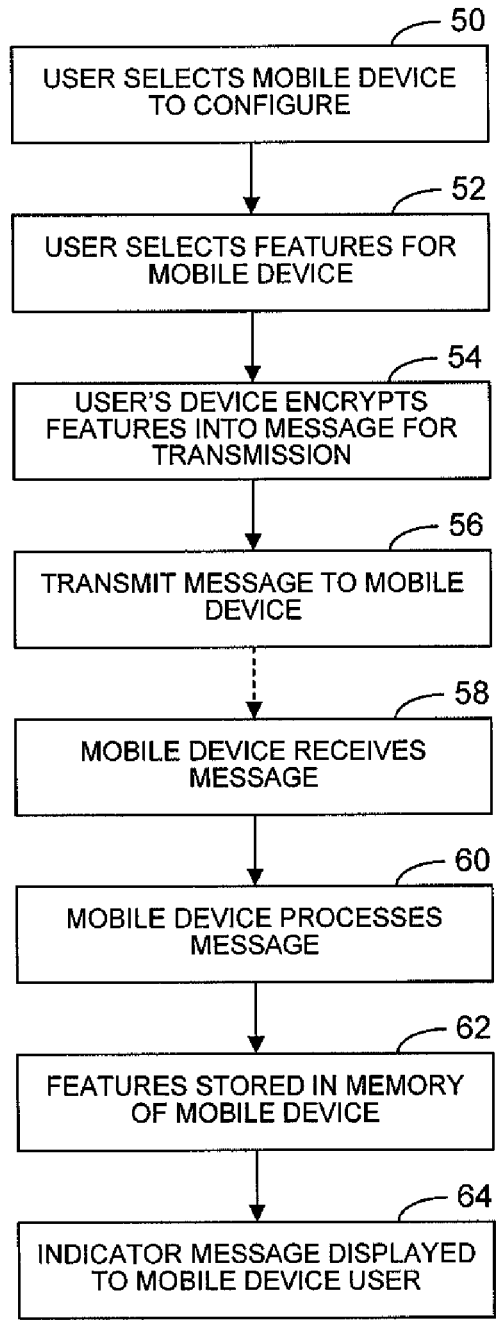
FIG. 3
FIG. 5

SYSTEM AND METHOD FOR WIRELESS DEVICE CONFIGURATION

RELATED APPLICATIONS

This is a continuation application of U.S. application No. 10/120,956 filed on Apr. 11, 2002, and issuing as U.S. Patent No. 7,043,263 on May 9, 2006.

FIELD OF THE INVENTION

The present invention relates to wireless communications devices, in particular to configuring or reconfiguring a wireless device by transmitting a configuration message from another wireless device or a computer to the wireless device to be configured.

BACKGROUND OF THE INVENTION

There are a variety of wireless communication devices (also referred to herein as mobile communication devices and mobile devices) available for wireless or remote communications including mobile cellular and satellite telephones, pagers, personal digital assistants (PDAs), and the like. These wireless communication devices typically comprise a rigid housing enclosing a printed circuit board, an associated microprocessor, electronic and electro-acoustic components, and a portable power supply such as a battery. Wireless communication devices communicate through a variety of means, including antennas that transmit and receive radio frequency (RF) signals, infrared (IR) emitters and receivers, or cable connections to input/output ports of computers and other mobile devices.

The user of the mobile device interfaces with the circuitry and microprocessor of the device through a keypad, or touchpad, located on the front outer surface of the housing. Keys on the keypad are pressed by the user to temporarily close an internal switch and send a signal to the microprocessor where an appropriate routine processes the input and operates the device. On mobile telephones, graphical elements, such as alphanumeric characters and icons, are located on or near the keys of the keypad to guide the user in interfacing with the mobile device. A display on the housing of the device provides a readout of data input by the user, access to spatially navigated menu trees, includes a graphical user interface (GUIs), windows, and messages.

Wireless communication devices are configured, or "provisioned", for various modes of operation. The configuration determines how basic functions of the wireless device will operate, such as setting or resetting wireless voice and data exchange protocol parameters, parameters used to enable or disable communication features, and local network services available to the mobile device. Examples of communication features include, but are not limited to, call forwarding, call waiting, caller identification, automatic callback, conference calling, message waiting notification, call encryption, voice mail, cost of call notification, enhanced vocoder (voice encoder), and the ability to transmit and receive textual messages.

Mobile devices are also configured so that communications occur through the appropriate service provider and are invoiced properly. A telephone number and a binary mobile identification number (MIN), e.g., a 34-bit MIN, for analog communications, (international mobile subscriber identity (IMSI) for CDMA communications), used to identify a particular mobile subscriber within the mobile telephone communication network, are also configured into a mobile device in a number assignment module (NAM) within non-volatile memory of the mobile device. The NAM is also used to indicate whether the mobile functions in the personal communication service (PCS) band (1.9 GHz) or the cellular band (800 MHz). Other configuration information can include an electronic serial number (ESN), network identification (NID), system identification (SID), a home registration indicator, a preferred roaming list (PRL), and other information that allows the network base station to locate and determine the operating characteristics and capabilities of the mobile device. The configuration can be preset in the mobile device, set into the mobile device upon entering an appropriate access code, or set after connection to the wireless carrier network through which the mobile device operates.

Typically, the configuration is established after connection to the wireless carrier network, commonly referred to as over-the-air service provisioning (OTASP). A specification for OTASP operation can be found in "Over-the-Air Service Provisioning of Mobile Stations in Spread Spectrum Systems", TIA/EIA/IS-683-A, incorporated herein by reference. Local service parameters are acquired from and set by the carrier network via the over-the-air function/customer service center (OTAF/CSC) through a particular server, typically that of the communication service provider. The mobile device requests configuration information from a network server and is then configured "over the air" in accordance with the information acquired from the server. The information obtained from the server is executable or binary code containing interfaces, data, and operational parameters that modify local service parameters to set or alter mobile functions, such as communication features, including whether the mobile device will support cellular or personal communication service, dual-band or single band transmission, analog or digital transmission protocol, etc.

Users are not directly provided the information necessary to configure, or reconfigure, a mobile device. However, most mobile devices can be reconfigured by accessing a "hidden" menu within the mobile processor. To do so, the communications service provider must either contact the user, or subscriber, in order to instruct the user how to reconfigure the mobile device. Alternatively, the mobile device must be taken to a service provider service center. The mobile device cannot be reconfigured for a particular feature until the appropriate access code has been entered into the mobile device to access the appropriate configuration menu. Particular communication features require a feature code in order to set or reset the feature.

Once configured, information is exchanged between mobile devices or between mobile devices and other devices, such as computers, via RF signals, or cable connections sometimes referred to as "connectivity kits". Wireless RF transmission provides the longest transmission range currently available and is often more flexible than cable transmission.

As mobile designs have advanced over time, more features are available to the user, such as the ability to program, store, and transmit data. Mobile devices store contact information, for example, names, telephone numbers, addresses, e-mail addresses, web site addresses, and scheduling information such as meetings and appointments. Many mobile devices are capable of transmitting textual data as well as voice information to other mobile devices, computers, servers, or over the Internet by means such as short messaging systems (SMS), discussed below, and Internet protocol-based over-the-air configuration management (IOTA protocol).

In order to transmit data and text messages between mobile devices or between mobile devices and computers, servers, or the Internet, spatially navigated menus shown on the display are typically implemented to aid the user in inputting messages and data, and also to aid the user in accessing data for revision or transmission. To improve the efficiency of text message transmission between mobile devices, a variety of SMS have been designed for rapid text entry. Early applications of SMS were used by telephone operators to alert subscribers to newly received voice mail messages or stored facsimiles by displaying a simple message on the mobile display that the user saw once the mobile was turned on. Later applications of SMS provide users with a list of default messages that are chosen by a single keystroke in order to be sent, for example, "please call home." Upon choosing the predefined message, the sending mobile would automatically send it to the receiving mobile. One advantage of an SMS is that it does not require the receiving mobile to be powered on in order to receive the message. The sent message is stored in the communication system until the receiving mobile is powered on. The message is then automatically received, stored on the receiving mobile, and displayed on the mobile display.

With increasing reliance on wireless communication, particularly via mobile devices, it is desirable for individuals or organizations to be able to control the configuration of a particular mobile, and to be able to monitor the current configuration status of the mobile. Currently, mobile devices are constrained by the service provider to the configuration provided under the service plan and can only be configured, or reconfigured, by the carrier network, or by accessing the appropriate configuration menu by secret code.

Accordingly, a method is needed whereby mobile devices can be configured or reconfigured for particular features in a user-friendly manner to enhance communication efficiency and to minimize communication costs.

SUMMARY OF THE INVENTION

In an exemplary embodiment of the present invention a mobile device is directly configured with features selected by a user via another mobile device or from a computer. In an exemplary embodiment, the mobile device is configured over wireless means so that communication distance does not inhibit the process. In another exemplary embodiment of the present invention, the configuration status of a mobile device is retrieved from the mobile device by communication from another mobile or a computer. The present invention overcomes the limitations existing in the prior art by implementing a conventional SMS or IOTA protocol to configure and reconfigure features of mobile devices.

BRIEF DESCRIPTION OF THE DRAWINGS

The accompanying drawings, which are incorporated into and form a part of the specification, illustrate preferred embodiments of the present invention and, together with the description, serve to explain the principles of the invention. The drawings are only for the purpose of illustrating exemplary embodiments of the invention and are not to be construed as limiting the invention.

FIG. 3 is a flow diagram of the method of configuring a mobile device according to an exemplary embodiment of the present invention.

FIG. 5 is a flow diagram of the method of configuring a mobile device according to the embodiment of FIG. 4.

DETAILED DESCRIPTION

An exemplary embodiment of the present invention is a method and system for configuring a mobile device. The method and system allows an administrator, operating independently, yet within the parameters set by a carrier network, to use an SMS or an IOTA protocol to communicate feature codes to a mobile device, as well as to retrieve the current configuration status of the mobile device. As used herein the phrase "feature codes" refers to codes depicting a variety of communication features available to a typical mobile device, including wireless voice and data exchange protocol parameters, parameters used to enable or disable communication features, and local network services available to the mobile device. Such features may include but are not limited to call blocking, call forwarding, call waiting, caller identification, automatic callback, conference calling, message waiting notification, call encryption, voice mail, cost of call notification, enhanced vocoder (voice encoder), and the ability to transmit and receive textual messages.

Features also include such capabilities as whether the mobile device can support cellular or personal communication service, IS 95 or CDMA 2000 modulation protocol, dual-band or single band transmission, analog or digital transmission protocol, etc. The term "administrator" as used herein refers to the device through which the user or individual within a business organization controls the configuration of a mobile device. Such a device can include a second mobile device, a computer, or a server.

Figure 1:
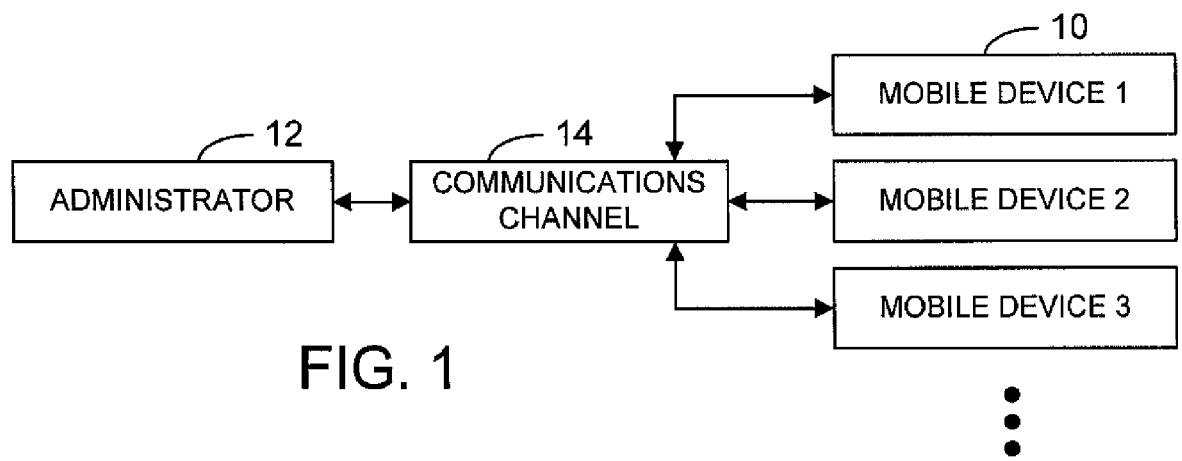
FIG. 1 is a block diagram illustrating an exemplary embodiment of the present invention for configuring a mobile device, depicting communication between a plurality of mobile devices and an organization administrator.

Referring to FIG. 1, a block diagram depicts an exemplary embodiment of the present invention. A plurality of mobile devices 10 used within an organization, such as a particular business environment, communicate with an organization administrator 12 through communications channel 14. Communications channel 14 can comprise RF or other wireless transmission means between mobile devices 10 and administrator 12. Communications channel 14 can operate via the Internet Protocol (IP), Wireless Application Protocol (WAP), or other suitable transmission protocol. Preferably the communications channel is wireless, so that distance and flexibility of communication is maximized. In this system, administrator 12 operates as a mobile communications administrator for the organization, capable of communicating feature codes to mobile devices 10 and retrieving configuration data from mobile devices 10. It will be understood in this embodiment of the invention that administrator 12 comprises a computer, a server for a particular organization, or other equivalent device.

Figure 2:
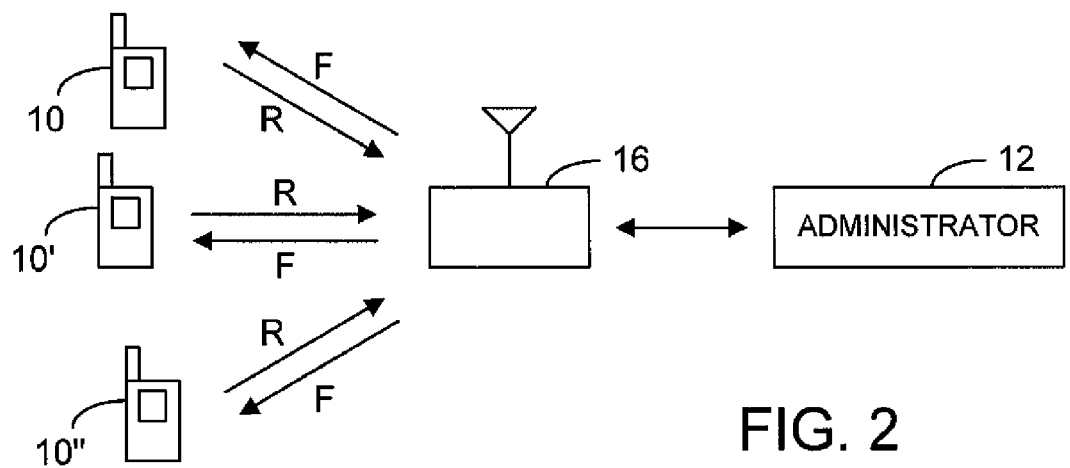
FIG. 2 is a diagram illustrating the embodiment of FIG. 1 operating in a cellular telephone communications network.

Referring to FIG. 2, a diagram illustrates a mobile cellular telephone communications system within which an embodiment of the present invention as described above can be implemented. Three mobile devices 10, 10', and 10" are shown with a single base transceiver station 16 within a cellular communications site, or cell. A cell is generally defined as a particular RF coverage area. As a mobile device changes location, it can move from one cell to the next if necessary to maintain communication. Base station 16 is a multi-circuit transceiver located at the center of the cell whose primary purpose is to handle incoming and outgoing calls within the cell. Calls originating from a particular mobile device are relayed through base station 16. All mobile communications occur through the base stations of each cell via RF transmission, as well as through a mobile telephone switching office (MTSO) computer that is in communication with each base station. Reverse channel link R represents RF communication from mobile device 10 to base station 16, while forward channel link F represents RF communication from base station 16 to mobile device 10, when mobile device 10 is in operation. Transmission may occur in an analog mode, such as via advanced mobile phone service (AMPS), or a digital mode, such as code-division multiple access (CDMA) or time-division multiple access (TDMA) modulation techniques.

An exemplary embodiment of the present invention is preferably implemented within such a cellular telecommunications environment depicted in FIG. 2. Administrator 12 configures mobile devices 10 via RF communication through base station 16. Mobile feature codes are encrypted into a message and transmitted to mobile device 10 from administrator 12 in the forward link via base station 16. "Encrypt" will be understood herein to refer to incorporating the information into a message for transmission and need not necessarily mean that the information is somehow disguised to inhibit interception by a third party.

FIG. 3 is a flow diagram demonstrating the methodology of an exemplary embodiment of the invention operating within the communications network of FIG. 2. Certain details and features have been left out of the flow diagram of FIG. 3 that are apparent to a person of ordinary skill in the art. For example, a step may consist of one or more sub-steps or may involve specialized equipment or materials, as known in the art. While steps 30 through 44 shown in FIG. 3 are sufficient to describe one embodiment of the present invention, other embodiments of the invention may utilize steps different from those shown.

In order to configure selected mobile devices within the organization for particular features, the organization administrator 12 is preferably guided through the feature configuration process by a series of menus or other GUIs. First, the mobile or mobile devices 10 for which selected features are to be set are selected as shown in block 30. Mobile devices can be selected by telephone number, by MIN or IMSI, or any other appropriate designation. In block 32, the feature or features are selected for the mobile device 10.

Continuing with FIG. 3, once features are selected, the various feature codes are encrypted into a message by suitable software operating within administrator 12, as shown in block 34. The message preferably contains at least three identifying strings, including the mobile identifier (such as an MIN), a bit or bits to indicate to the mobile processor that features are to be set or reset, and the encrypted feature codes. In block 36, the message is then transmitted to the receiving mobile or mobile devices 10 by means of a SMS or IOTA protocol. Upon receiving the encrypted message as shown in block 38, receiving mobile device 10 decrypts the message to indicate that feature codes are to be set or reset, and then processes the message and configures the mobile device according to the feature codes by a suitable software routine operating in the mobile processor, as shown in block 40. In block 42, feature codes are then stored in non-volatile memory within mobile device 10 until such time as another feature code message is received.

The process of receiving feature codes is therefore transparent to the mobile device user. Optionally as shown in block 44, the user is notified in the event that administrator 12 resets the features of mobile device 10, by means of a message displayed on the mobile display, such as: "Feature codes have been reset. Please see updated list of available communication features."

The present invention further provides the ability to retrieve the current configuration status of mobile device 10. First administrator 12 selects the mobile device for which the configuration status is needed. A request for configuration status is then encrypted into a message for transmission to mobile device 10 by a suitable software routine operating within administrator 12. The message preferably includes a string to indicate the receiving mobile identification, and a bit or bits to indicate to the mobile processor that the configuration status is requested. The message is then transmitted to the receiving mobile device 10 over a mobile wireless communications channel via an SMS or IOTA protocol. Upon receiving the encrypted message, the receiving mobile decrypts the message to indicate that the configuration status is requested by way of a suitable software routine operating in the mobile processor. Mobile device 10 then transmits a code indicating its current configuration through the reverse link via base station 16 to administrator 12 by means of a message in an SMS or IOTA protocol. This process is transparent to the mobile device user. However, the user is optionally notified that the configuration status has been forwarded to administrator 12 by displaying a message on the mobile device display.

The present invention is particularly suited for operation within an organization, such as within a particular business, to enhance communication efficiency and to reduce communication costs within an organization. The ability to program features of mobile devices operating within the organization is limitless. However, examples include the ability to program a mobile device to only receive telephone calls from a particular telephone number; to block the ability of the mobile device to make "long distance" calls; to lock access to mobile device operation except by means of a password; to program a lost mobile device to only be able to dial a particular telephone number so that it can be returned to its proper owner; and other organization-specific parameters.

Figure 4:
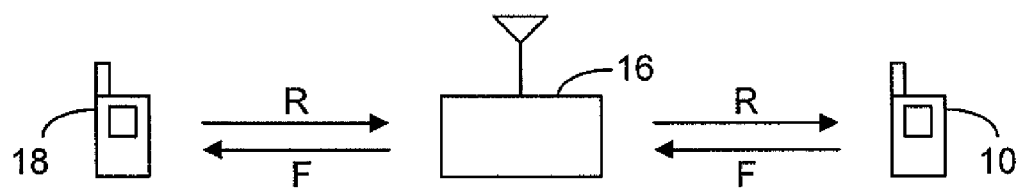
FIG. 4 is a block diagram illustrating another exemplary embodiment of the present invention for configuring a mobile device, wherein a second mobile device operates as the administrator to configure the first mobile device.

Referring to FIG. 4, a second exemplary embodiment of the present invention for configuring mobile device 10 is shown. In this embodiment, mobile device 10 is configured, or reconfigured, by way of an administrator comprising a second mobile device 18. The second mobile device 18 configures mobile device 10 by communicating with mobile device 10 via base station 16 in the same manner as described above with respect to the first embodiment. In this embodiment a user simply calls mobile device 10 from mobile device 18 in order to configure or to determine the configuration status of mobile device 10, making this embodiment particularly convenient and efficient for a user. In this manner the user can remotely reconfigure mobile device 10 without the need for contacting a service provider.

Referring to FIG. 5, a flow diagram demonstrates the methodology of the second exemplary embodiment of the invention operating within the communications network of FIG. 4. Certain details and features have been left out of the flow diagram of FIG. 5 that are apparent to a person of ordinary skill in the art. For example, a step may consist of one or more sub-steps or may involve specialized equipment or materials, as known in the art. While steps 50 through 64 shown in FIG. 5 are sufficient to describe one embodiment of the present invention, other embodiments of the invention may utilize steps different from those shown.

To configure mobile device 10 for particular features, the user is preferably guided through the configuration process by a series of menus or other GUIs on mobile device 18 operated by suitable software within the mobile processor. First, the user selects mobile device 10 which is to be configured by telephone number, by MIN or IMSI, or any other appropriate designation, block 50. Then the user selects the feature or features for mobile device 10, block 52. Once features are selected, the various feature codes are encrypted into a message by a suitable software routine operating within mobile device 18, block 54. As in the first embodiment, the message preferably contains at least three identifying strings, including the mobile identifier (such as an MIN), a bit or bits to indicate to the receiving mobile processor that features are to be set or reset, and the encrypted feature codes.

In block 56, the message is then transmitted to the receiving mobile device 10 over a wireless communications channel, such as the cellular telephone network depicted in FIG. 4, by means of an SMS or IOTA protocol. Upon receiving the encrypted message, block 58, the receiving mobile device 10 decrypts the message to indicate that feature codes are to be set or reset, and then processes the message according to the feature codes, configuring mobile device 10 accordingly, block 60. Feature codes are then stored in non-volatile memory within mobile device 10 until such time as another feature code message is received, block 62. As in the first embodiment, the process of receiving feature codes is transparent to the user of mobile device 10. Optionally, as shown in block 64, the user of mobile device 10 is notified in the event that reconfiguration has occurred, by means of a message displayed on the display of mobile device 10; for example: "This mobile device can only call 555-1212. Please call now." In the second embodiment mobile device 18 can retrieve the current configuration status of mobile device 10 in a similar manner as described above with respect to the first embodiment.

Although the present invention can be implemented within a carrier network in a variety of ways, one suitable implementation requires subscription to a particular service plan from a service provider. The user, or business organization, would then retain the ability to program a mobile device for certain features available within the service plan. It is to be understood that the present invention is not limited to operation within a cellular communications environment, or to RF communication, as will be understood by those skilled in the art.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, the specific steps of the methods could be modified from that discussed above without departing from the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

The invention claimed is:

1. A system for remote configuration of a wireless device, the system comprising:
    a communication network operated by a carrier that supports communications with the wireless device;
    a configuration server in communication with the communication network, the configuration server for sending a configuration message to a wireless device, the configuration message having at least three identifying strings comprising a mobile identifier, a set/reset bit, and at least one encrypted feature code, the configuration message generated by a user associated with a business organization; and
    the wireless device for receiving the configuration message from the configuration server via the communication network, the wireless device comprising a processor for decrypting at least one feature code from the at least one encrypted feature code and configuring the wireless device according to the at least one feature code and the set/reset bit, the wireless handset configured to communicate a code using the communication network that indicates the configuration of the wireless device to the business organization.

2. The system of claim 1, wherein the configuration message is a Short Message System (SMS) message.

3. The system of claim 1, wherein the configuration message is an Internet Protocol-based Over-the-Air (IOTA) message.

4. The system of claim 1, wherein the wireless device further comprises a user interface, the processor for indicating on the user interface that the wireless device has been configured.

5. The system of claim 1, wherein the wireless device further comprises a non-volatile memory for storing the at least one feature code.

6. A method for remote configuration of a wireless device, the method comprising:
    generating a configuration message on a configuration server, the configuration message having at least three identifying strings comprising a mobile identifier, a set/reset bit, and at least one feature code, the configuration message generated by a user associated with a business organization;
    transmitting the configuration message to the wireless device from a configuration server over a wireless communication network operated by a carrier that supports communication with the wireless device; and
    the wireless device receiving the configuration message from the configuration server via the wireless communication network;
    the wireless device decrypting at least one feature code from the at least one encrypted feature code;
    configuring the wireless device according to the at least one feature code and the set/reset; and
    communicating a code using the communication network that indicates the configuration of the wireless device to the business organization.

7. The method of claim 6, wherein the configuration message is a Short Message System (SMS) message.

8. The method of claim 6, wherein the configuration message is an Internet Protocol-based Over-the-Air (IOTA) message.

9. The method of claim 6, further comprising:
    indicating on a user interface of the wireless device that the wireless device has been configured.

10. The method of claim 6, further comprising:
    storing the at least one feature code in a non-volatile memory of the wireless device.

* * * * *